(12) United States Patent
Hua et al.

(10) Patent No.: US 11,102,058 B1
(45) Date of Patent: Aug. 24, 2021

(54) METHOD AND SYSTEM FOR NETWORK FUNCTION RECOVERY NOTIFICATION

(71) Applicant: Verizon Patent and Licensing Inc., Basking Ridge, NJ (US)

(72) Inventors: Suzann Hua, Beverly Hills, CA (US); Chien-Yuan Huang, Basking Ridge, NJ (US); Emerando M. Delos Reyes, Pleasant Hill, CA (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/992,337

(22) Filed: Aug. 13, 2020

(51) Int. Cl.
*H04L 12/24* (2006.01)

(52) U.S. Cl.
CPC .................. *H04L 41/0668* (2013.01)

(58) Field of Classification Search
CPC . H04L 41/0668; H04L 41/0654; H04L 45/22; H04L 45/28; H04L 69/40; G06F 11/202; G06F 11/2023; G06F 11/2025; G06F 11/2028
See application file for complete search history.

(56) References Cited

U.S. PATENT DOCUMENTS

| 2014/0359340 A1* | 12/2014 | Hua | H04L 65/1016 |
| | | | 714/4.11 |
| 2019/0149397 A1* | 5/2019 | Celozzi | H04L 41/0672 |
| | | | 370/228 |

OTHER PUBLICATIONS

Solution for NF Service Discovery, 3GPP TSG CT4 Meeting #79, Krakow, Poland, Aug. 21-25, 2017.*

* cited by examiner

*Primary Examiner* — Matthew M Kim
*Assistant Examiner* — Kurosu Risa Altaf

(57) ABSTRACT

Systems and methods described herein include receiving, from a first network function, a request to receive a notification when a second network function becomes available after a failure. A status update may be received from the second network function indicating that the second network function is available. It may be determined that the second network function is in a stable state. A notification may be sent, to the first network function, that the second network function is available along with an indication of a time period in which to switch from accessing a third network function to accessing the second network function.

20 Claims, 6 Drawing Sheets

| NF INSTANCE 504 | NF TYPE 506 | STATUS 508 | ALLOWED SWITCH BACK TIME 510 | EXPECTED SWITCH BACK TIME 512 |
|---|---|---|---|---|
| | | | | |
| | | | | |
| | | | | |

METHOD AND SYSTEM FOR NETWORK FUNCTION RECOVERY NOTIFICATION

BACKGROUND

One benefit of Fifth Generation (5G) networks is Ultra Reliable Low Latency Communication (URLLC). To support URLLC, new 5G Network Functions (NFs) support geo-redundancy deployment, which ensures that an NF is available if one NF instance become unavailable. With geo-redundancy, if a primary NF fails, a secondary NF at a different location may perform the functions of the primary NF until the primary NF is available. Currently there is no mechanism to automatically switch functionality from the secondary NF back to the primary NF when the primary NF recovers from a system failure.

BRIEF DESCRIPTION OF THE DRAWINGS

FIG. 5 is a diagram of a Network Repository Function (NRF) database, according to an implementation described herein.

DETAILED DESCRIPTION OF THE PREFERRED EMBODIMENTS

Figure 1:
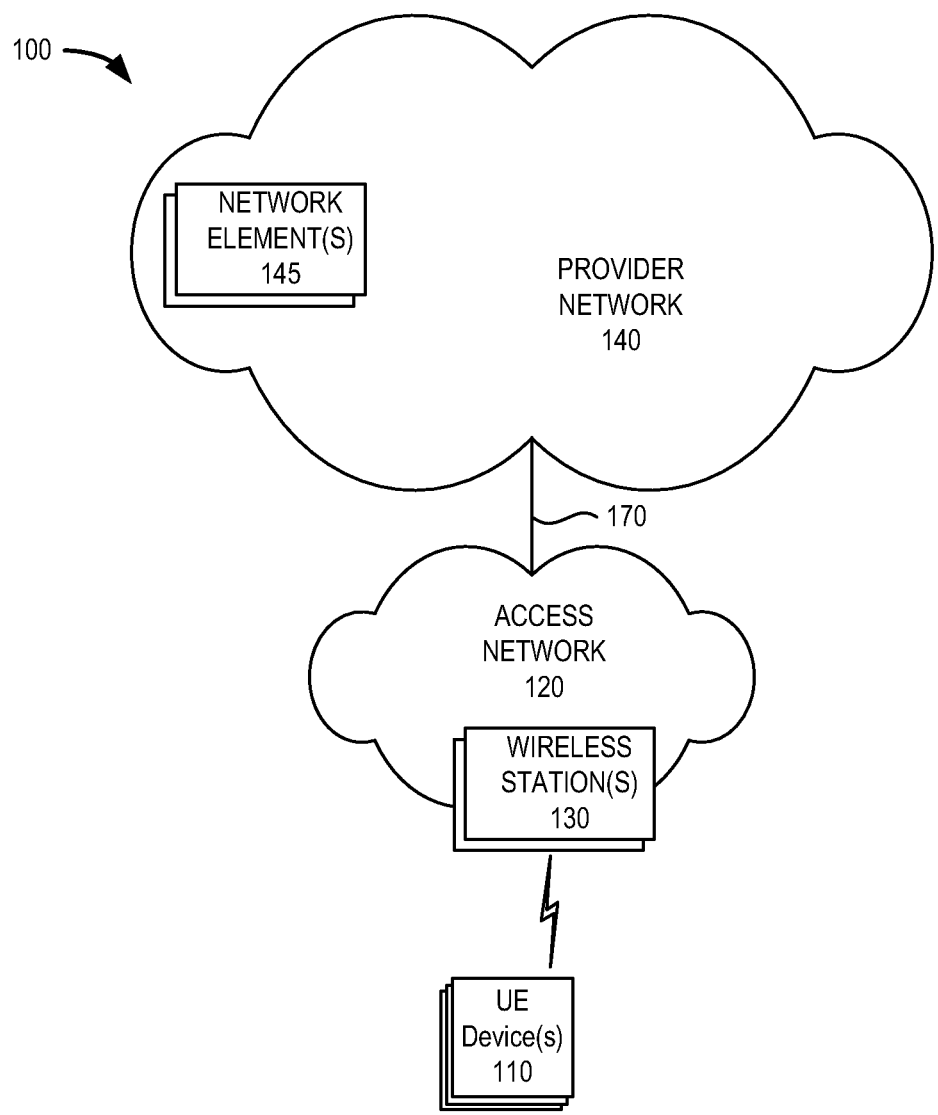
FIG. 1 is a diagram illustrating a network environment according to an implementation described herein.

The following detailed description refers to the accompanying drawings. The same reference numbers in different drawings may identify the same or similar elements. Also, the following detailed description does not limit the invention.

When a failover occurs in a network, user plane traffic and other traffic (e.g., control plane, etc.) may be moved or transferred from primary network devices or NFs (e.g., that failed) to secondary network devices or NFs. In a geographic-based failover design, the primary network devices and the corresponding secondary network devices may not be co-located. For example, the primary network devices may be located at one service aggregation point (SAP) or location and the secondary network devices may be located at another SAP or location. In this way, a service outage may be prevented based on the geographic redundancy or geo-redundancy. The deployment of geo-redundancy may provide resiliency in the event that the primary network device fails due to a natural disaster, catastrophic event, glitches that cause network outages, or for other reasons.

Currently, when a failed primary network device has recovered from a system failure, there is no mechanism to automatically switch network elements back to the primary network device. If network elements are accessing secondary network devices when the primary network device was unavailable, currently there is no way to automatically notify the network elements that the primary network is again available and the network elements should switch back to the primary network device. Providing a primary network device recovery switch back notification may make the switch back process smoother and faster while reducing manual intervention from the service provider, clients, and/or consumers.

One NF in a 5G core network is the Network Repository Function (NRF). An NRF may provide NF registration, management, discovery, and/or authentication services within the 5G core. The NRF may store information identifying multiple NF devices for a particular NF type. When a new NF, such as, for example, an Access and Mobility Management Function (AMF) is brought online, the AMF may register its reachability and services information with the NRF so that other NFs in the 5G core network are able to communicate with the AMF. When another network component, such as, for example, a Policy Control Function (PCF), needs to communicate with an AMF, the PCF may send a request to the NRF for an available AMF and the NRF may provide the reachability and other information relating to the AMF to the requesting PCF.

The term "NF" or "NF device," as used herein, may refer to a dedicated hardware component implementing an NF instance or to a hardware component that is part of a common shared physical infrastructure used to implement virtualized NF instances using Software-Defined Networking (SDN) or another type of virtualization technique. Thus, the "NF" or "NF device" may be configured to implement a particular NF instance as a Virtual Network Function (VNF) (e.g., in a virtual machine), as a Cloud-native Network Function (CNF) (e.g., in a container), as a serverless architecture event handler, and/or using a different type of virtualization implementation. The common shared physical infrastructure may be implemented using one or more computer devices in a cloud computing center, a mobile edge computing (MEC) system associated with a base station, and/or in another type of computer system.

Systems and methods described herein provide a mechanism for automatically notifying network elements or NFs when a primary network element or NF has recovered after failure. Implementations described herein may provide for a subscription service that allows a consumer or client NF to subscribe to the NRF to receive notifications when the primary NF has recovered after being unavailable. In one implementation described herein, when a primary NF recovers after a system failure, the primary NF may send the NRF a Back-To-Service status update indicating that the primary NF has recovered. In another implementation described herein, a consumer NF may subscribe to a service associated with the NRF to receive a Back-To-Service notification from the NRF when a primary NF recovers after system failure.

FIG. 1 is a diagram illustrating concepts described herein. As shown in FIG. 1, an environment 100 may include one or more user equipment (UE) devices 110 (referred to herein collectively as UEs 110 or individually as UE 110), an access network 120, one or more wireless stations 130, and a provider network 140.

UE 110 may include a wireless Machine-Type-Communication (MTC) device that communicates wirelessly with other devices over a machine-to-machine (M2M) interface; a handheld wireless communication device; a wearable computer device (e.g., a head-mounted display computer device, a head-mounted camera device, a wristwatch computer device, etc.); a global positioning system (GPS) device; a desktop computer; a media playing device; a portable gaming system; a laptop, tablet, or another type of portable computer; a smartphone; and/or any other type of computer device with wireless communication capabilities. UE 110 may be used for voice communication, mobile broadband services (e.g., video streaming, real-time gaming, premium Internet access etc.), best-effort data traffic, and/or other types of applications.

Access network 120 may provide access to provider network 140 for wireless devices, such as UE 110. Access network 120 may enable UE 110 to connect to provider network 140 for Internet access, non-Internet Protocol (IP) data delivery, cloud computing, mobile telephone service, Short Message Service (SMS) message service, Multimedia Message Service (MMS) message service, and/or other types of data services. Access network 120 may include wireless stations 130, and UE 110 may wirelessly communicate with access network 120 via wireless station 130. Access network 120 may establish a packet data network connection between UE 110 and provider network 140 via one or more Access Point Names (APNs). For example, wireless access network 120 may establish an Internet Protocol (IP) connection between UE 110 and provider network 140. In another implementation, access network 120 may provide access to a service or application layer network, a cloud network, a multi-access edge computing (MEC) network, a fog network, and so forth. Furthermore, access network 120 may enable a server device to exchange data with UE 110 using a non-IP data delivery method such as Data over Non-Access Stratum (DoNAS).

Access network 120 may include a 5G access network or another advanced network, such as a Fourth Generation (4G) LTE network. Additionally access network 120 may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macro-cells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device and/or an eNodeB base station device that includes one or more devices (e.g., wireless transceivers) and other components and functionality that allow UE 110 to wirelessly connect to access network 120. Wireless station 130 may correspond to a macrocell or to a small cell (e.g., a femtocell, a picocell, a microcell, etc.). In other implementations, wireless station 130 may include another type of base station for another type of wireless network. Wireless stations 130 may connect to provider network 140 via backhaul links 170.

Provider network 140 may include a local area network (LAN), a wide area network (WAN), a metropolitan area network (MAN), an optical network, a cable television network, a satellite network, a wireless network (e.g., a code-division multiple access (CDMA) network, a general packet radio service (GPRS) network, and/or a long-term evolution (LTE) network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE 110, and may interface with other external networks, such as private IP networks.

According to one implementation, provider network 140 may include a core network for one or multiple access networks 120. For example, provider network 140 may include the core part of a 5G New Radio network, etc. Depending on the implementation, provider network 140 may include various network elements 145, such as a gateway, a support node, a serving node, a router, a switch, a bridge, as well as other network elements pertaining to various network-related functions, such as billing, security, authentication and authorization, network polices, subscriber profiles, etc. In some implementations, provider network 140 may include an Internet Protocol Multimedia Sub-system (IMS) network (not shown in FIG. 1). An IMS network may include a network for delivering IP multimedia services and may provide media flows between UE 110 and external IP networks (not shown in FIG. 1).

Although FIG. 1 shows exemplary components of environment 100, in other implementations, environment 100 may include fewer components, different components, differently arranged components, or additional functional components than depicted in FIG. 1. For example, in one implementation, environment 100 may include an MEC network that provides applications and services at the edge of a network, such as provider network 140. Additionally or alternatively, one or more components of environment 100 may perform functions described as being performed by one or more other components of environment 100.

Figure 2:
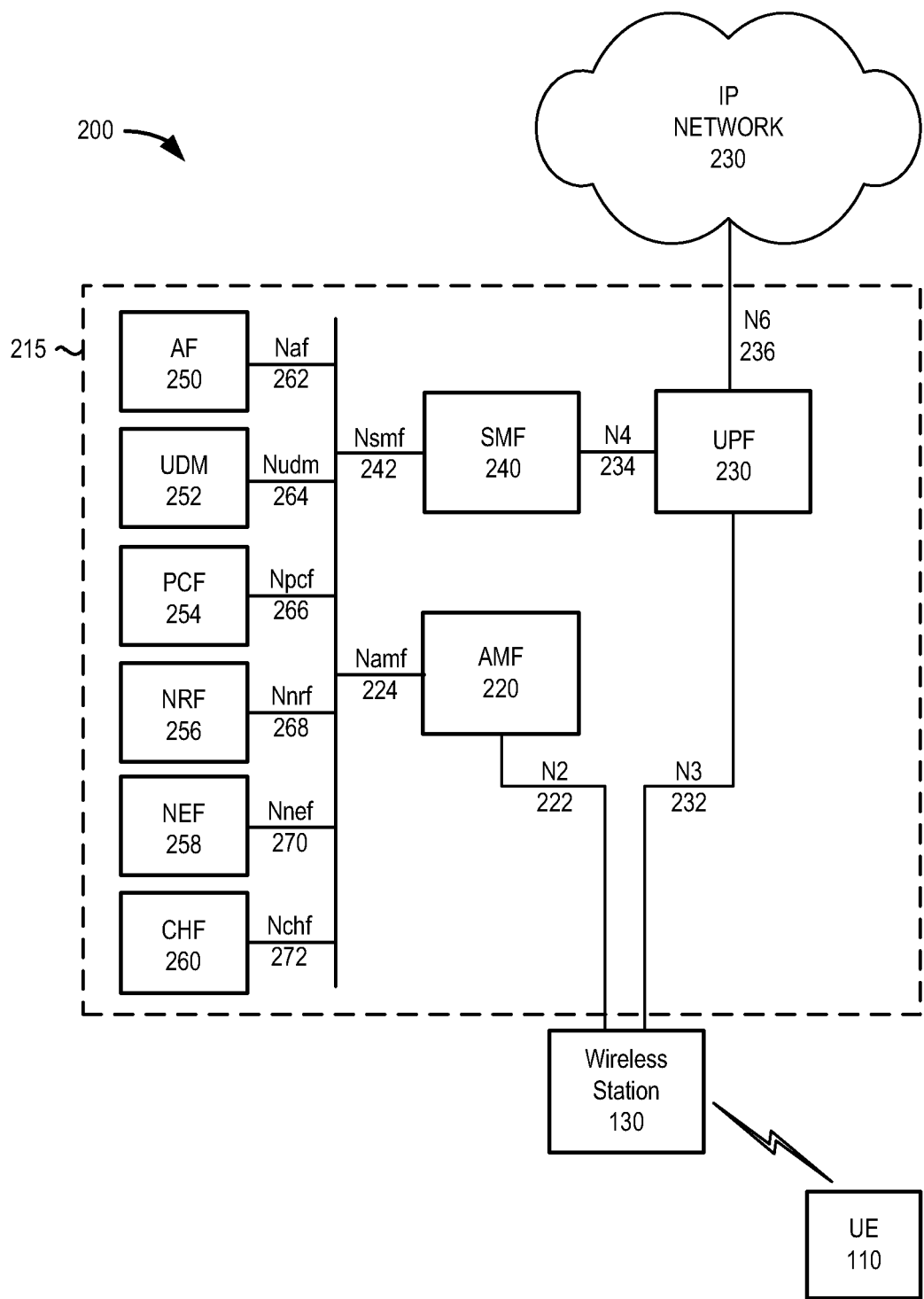
FIG. 2 is a diagram illustrating connections among devices in an exemplary portion of the network environment of FIG. 1.

FIG. 2 is a diagram illustrating a network environment 200 that includes exemplary components of environment 100 according to an implementation described herein. As shown in FIG. 2, network environment 200 may include UE 110, wireless station 130, a core network 215, and an IP network 230. Core network 215 and IP network 230 may correspond to, or be included in, provider network 140.

Core network 215 may include an Access and Mobility Management Function (AMF) 220, a User Plane Function (UPF) 230, a Session Management Function (SMF) 240, an Application Function (AF) 250, a Unified Data Management (UDM) 252, a PCF 254, an NRF 256, a Network Exposure Function (NEF) 258, and a Charging Function (CHF) 260. AMF 220, UPF 230, SMF 240, AF 250, UDM 252, PCF 254, NRF 256, NEF 258, and CHF 260 may correspond to network elements 145 of FIG. 1 and may each be implemented as separate network devices or as nodes shared among one or more network devices. While FIG. 2 depicts a single AMF 220, UPF 230, SMF 240, AF 250, UDM 252, PCF 254, NRF 256, NEF 258, and CHF 260 for illustration purposes, in practice, FIG. 2 may include multiple wireless stations 130, AMFs 220, UPFs 230, SMFs 240, AFs 250, UDMs 252, PCFs 254, NRFs 256, NEFs 258, and/or CHFs 260.

Wireless station 130 may include one or more devices and other components and functionality that enable UE 110 to wirelessly connect to access network 120 using 5G Radio Access Technology (RAT). Wireless station 130 may include, for example, a gNodeB (gNB) with a wireless transceiver with an antenna array configured for mm-wave wireless communication. In other implementation, wireless station 130 may include another type of base station. Wireless station 130 may communicate with AMF 220 using an N2 interface 222 and communicate with UPF using an N3 interface 232.

AMF 220 may perform registration management, connection management, reachability management, mobility management, lawful intercepts, Short Message Service (SMS) transport between UE 110 and an SMS function (not shown in FIG. 2), session management messages transport between UE 110 and SMF 240, access authentication and authorization, location services management, functionality to support non-3GPP access networks, and/or other types of management processes. AMF 220 may be accessible by other function nodes via a Namf interface 224.

UPF 230 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, send and forward an "end marker" to a Radio Access Network (RAN) node (e.g., wireless station 130), and/or perform other types of user plane processes. UPF 230 may communicate with SMF 240 using an N4 interface 234 and connect to IP network 230 using an N6 interface 236.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate charging data collection, termination of session management parts of Non-Access Stratum (NAS) messages, perform downlink data notification, manage roaming functionality, and/or perform other types of control plane processes for managing user plane data. SMF 240 may report data usage information to CHF 260 when the UE 110 is accessing online or offline applications or services. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UEs 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available NF instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information. The NF profile may additionally include a status associated with the NF and attributes indicating an allowed time period when consumer NFs may perform a switch back to the NF after failure and an expected switch back time after consumer NFs receive a Back-to-Service notification.

NRF 256 may be accessible via an Nnrf interface 268. The Nnrf interface 268 specification's NF service profile may include an NF status "Back-to-Service" that indicates that an NF is available after a system failure and subsequent recovery. The Nnrf interface 268 specification's Notification Event Type may include an event type "NF-Back-To-Service." Additionally, the Nnrf interface 268 specification's NF service profile may include attributes indicating an allowed time period when consumer NFs may perform a switch back to the NF after failure and an expected switch back time after consumer NFs receive a Back-to-Service notification.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

CHF 260 may provide an interface to a Convergent Charging System (CCS). CHF 260 may include the interface between the CCS and the provider network 140. CHF 260 may provide spending limits and quotas for services to SMF 240 and may collect usage information from SMF 240 for online and offline services. CHF 260 may be accessible via Nchf interface 272.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, a Network Slice Selection Function (NSSF) and/or other types of functions. Furthermore, while particular interfaces have been described with respect to particular function nodes in FIG. 2, additionally or alternatively, core network 215 may include a reference point architecture that includes point-to-point interfaces between particular function nodes.

Figure 3:
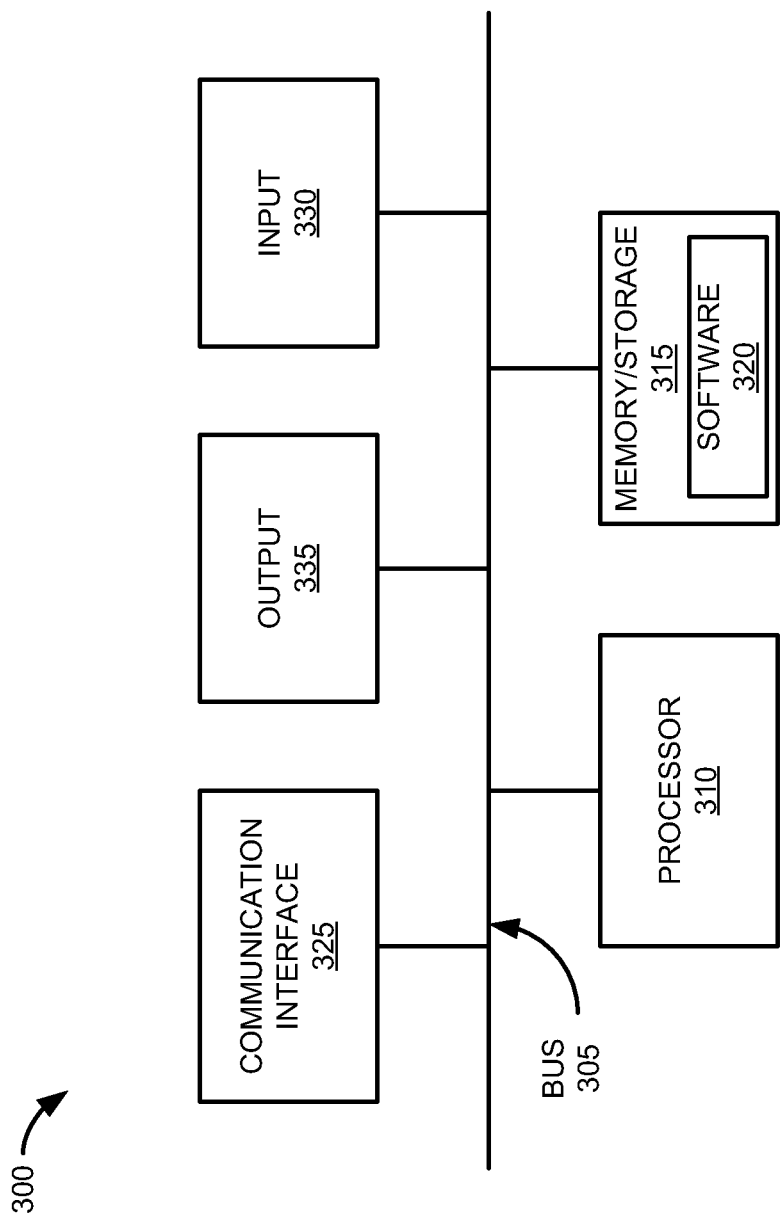
FIG. 3 is a diagram of exemplary components that may be included in one or more of the devices shown in FIGS. 1 and 2.

FIG. 3 is a diagram illustrating exemplary components of a device 300 that may correspond to one or more of the devices described herein. For example, device 300 may correspond to components included in UE 110, wireless station 130, network elements 145, AMF 220, UPF 230, SMF 240, AF 250, UDM 252, PCF 254, NRF 256, NEF 258, CHF 260, and/or other components of access network 120 and/or provider network 140. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction.

Communication interface 325 permits device 300 to communicate with other devices, networks, systems, devices, and/or the like. Communication interface 325 includes one or multiple radio frequency (RF) wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
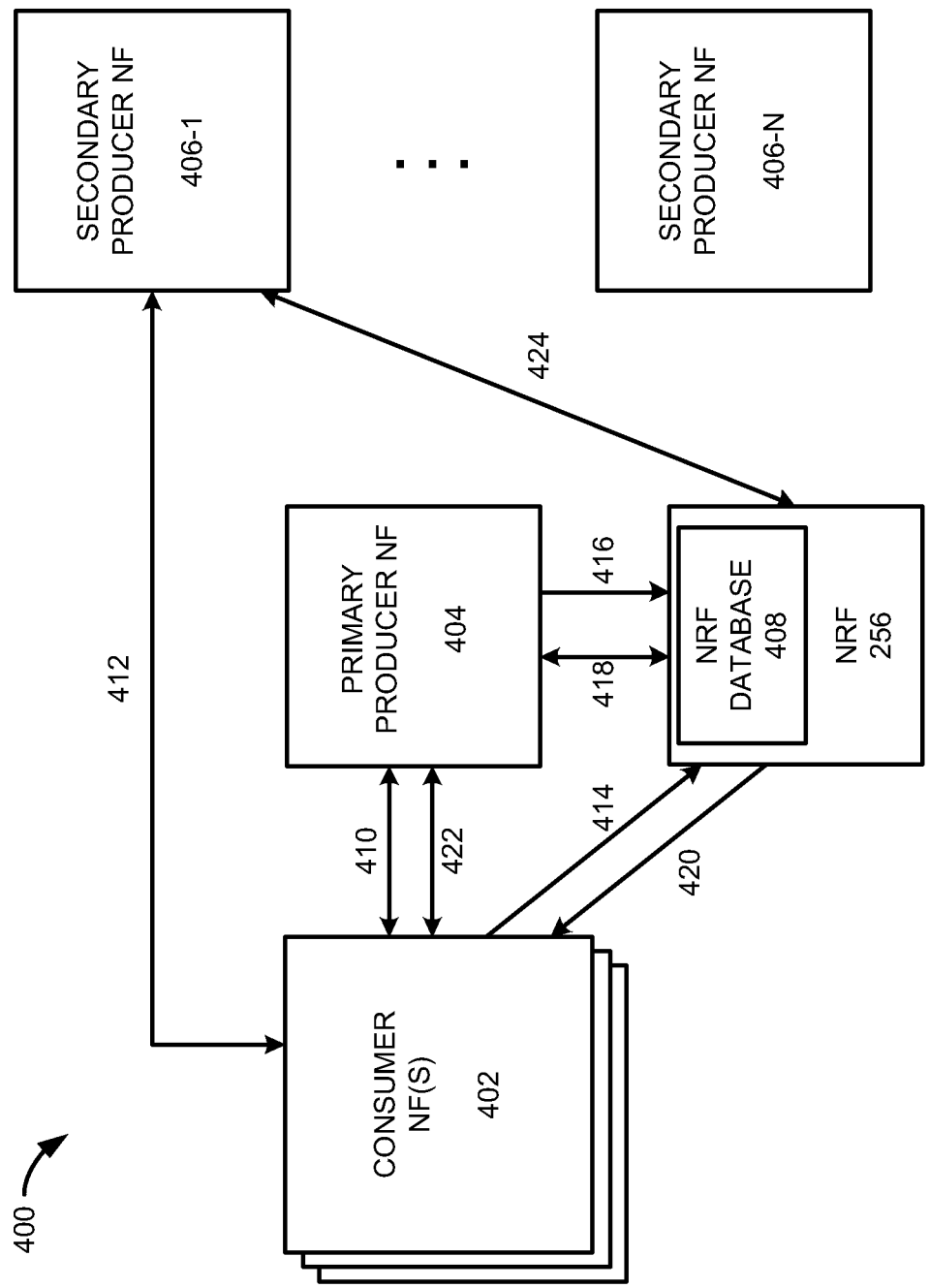
FIG. 4 is a block diagram of exemplary components of a system that may correspond to a portion of the network environment of FIG. 1 and/or FIG. 2.

FIG. 4 is a diagram illustrating a network environment 400 that includes exemplary components of environment 100 and/or environment 200 according to an implementation described herein. Environment 400 may include one or more consumer NFs 402 (referred to herein collectively as NFs 402 or individually as NF 402), primary producer NF 404, secondary producer NFs 406-1 to 406-N (referred to herein collectively as secondary producer NFs 406 or individually as secondary producer NF 406), and NRF 256.

Consumer NF 402 may refer to any NF instance, network element, or network device that is receiving a service from a producer NF instance, network element, or network device. Consumer NF 402 may correspond to, for example, AMF 220, UPF 230, SMF 240, AF 250, UDM 252, PCF 254, NRF 256, NEF 258, CHF 260, and/or other components of access network 120 and/or provider network 140.

Primary producer NF 404 may refer to a primary NF instance, network element, or network device that is providing services to consumer NF 402. Primary producer NF 404 may correspond to, for example, AMF 220, UPF 230, SMF 240, AF 250, UDM 252, PCF 254, NRF 256, NEF 258, CHF 260, and/or other components of access network 120 and/or provider network 140. Primary producer NF 404 may provide a service to the consumer NF 402 unless the primary producer NF 404 is unavailable due to a natural disaster, a catastrophic event, a system failure, a glitch that causes a network outage, or for any other reason.

Secondary producer NF 406 may refer to an NF instance, network element, or network device that provides services to a consumer NF 402 when primary producer NF 404 is unavailable. Secondary producer NF 406 may be located in a different geographic location than primary producer NF 404. In addition, secondary producer NF 406-1 may be located in a different geographic location than secondary producer NF 406-N and primary producer NF 404. In this way, if primary producer NF 404 is unavailable due to a natural disaster (e.g., earthquake, inclement weather, power outage, etc.) or other problem in a particular geographical location, secondary producer NF 406 may be unaffected by the natural disaster or problem and may be available as a backup producer NF. Furthermore, if both primary producer NF 404 and secondary producer NF 406-1 are unavailable, secondary producer NF 406-N may be available as a backup producer NF. Secondary producer NF 406 may provide services to consumer NF 402 until primary producer NF 404 has recovered, at which time primary producer NF 404 will provide the services to consumer NF 402. As shown by line 424, secondary producer NF 406 may be connected to and may communicate with NRF 256.

As shown by line 410 in FIG. 4, consumer NF 402 may initially receive services from primary producer NF 404. For example, consumer NF 402 may correspond to SMF 240 and primary producer NF 404 may correspond to PCF 254, and SMF 240 may receive services from PCF 254. For example, PCF 254 may provide policy rules to SMF 240.

If primary producer NF 404 fails for any reason and consumer NF 402 is unable to reach primary producer NF 404, consumer NF 402 may switch to secondary producer NF 406 to receive the services, as shown by line 412. Continuing with the example, when PCF 254 is unavailable, SMF 240 may communicate with a backup PCF 254 to receive services, such as receiving policy rules. In addition, as shown by line 414, consumer NF 402 may additionally send an event subscription request to NRF 256 to receive an "NF-Back-To-Service" notification when primary producer NF 404 is available and back to service. In one implementation, consumer NF 402 may send NRF 256 a message indicating an NF name and/or fully qualified domain name (FQDN) associated with primary producer NF 404 as well as a valid time and/or expiration in which to receive the notification.

When primary producer NF 404 has recovered from failure and is back to service, primary producer NF 404 may send profile update 416 to NRF 256 to indicate its status as "Back-To-Service." As described in detail with respect to FIG. 5, NRF 256 may store an indication of the "Back-To-Service" status in an entry corresponding to primary producer NF 404 in NRF database 408.

Upon receiving the "Back-To-Service" status update, NRF 256 may begin sending heartbeat signals to primary producer NF 404 to ensure that primary producer NF 404 is in a stable state (418). After receiving a heartbeat signal, primary producer NF 404 may send a communication to NRF 256 indicating that primary producer NF 404 has received the heartbeat signal and continues to be available for service. After receiving a particular number of successful heartbeat communications/responses from primary producer NF 404 or after receiving successful heartbeat communications/responses from primary producer NF 404 for a particular amount of time, NRF 256 may determine that primary producer NF 404 is stable and may resume its normal/available status. The particular number of successful heartbeat communications and/or the particular amount of time may be configurable.

After determining that primary producer NF 404 is back to service and stable, NRF 256 may send a "NF-Back-To-Service" indication to all consumer NFs 402 that have subscribed to the "NF-Back-To-Service" event for primary producer NF 404, as shown by line 420. In one implementation, NRF 254 may send the "NF-Back-To-Service" indication during a time period indicated by an entry associated with primary producer NF 404 in NRF database 408. In addition, as described further below with respect to FIG. 5, NRF 256 may send an expected switch back time to consumer NFs 402 indicating a time at which the consumer NFs 402 may switch back to primary producer NF 404 from secondary producer NF 406. In one implementation, the expected switch back time may indicate a length of time after consumer NF 402 receives the "NF-Back-To-Service" indication that consumer NF 402 should switch back to accessing primary producer NF 404.

When consumer NF 402 has received the "NF-Back-To-Service" notification from NRF 256, consumer NF 402 may switch back to primary producer NF 404 to access and receive services from primary producer NF 404, as shown by line 422. In one implementation, consumer NF 402 may switch back to primary producer NF 404 at the expected switch back time indicated by NRF 254.

FIG. 5 is a diagram illustrating exemplary information stored in an NRF database 408 of NRF 256 according to an implementation described herein. As shown in FIG. 5, NRF database 408 may include one or more records 502-1 to 502-N (referred to herein collectively as records 502 or individually as record 502). Each record 502 may store information relating to a particular NF instance or device.

Each record 502 may store information relating to a particular primary producer NF 404. Record 502 may include an NF instance field 504, an NF type field 506, a status field 508, an allowed switch back time period field 510, and an expected switch back time field 512. Record 502 may include additional fields not described herein. In addition, record 502 may not include all of the fields described herein. For example, the allowed switch back time field 510 and the expected switch back time field 512 may be optional fields and not all records 502 may include these fields.

NF instance field 504 may identify a particular NF instance in core network 215. NF instance field 504 may include an identifier associated with the particular NF instance, such as an NF name or FQDN. NF type field 506 may identify the NF type associated with the particular NF instance, such as, for example, an AMF, UPF, SMF, AF, UDM, PCF, CHF, NRF, NEF, NSSF, AUSF, EIR, NWDAF, SMSF, SEPP, N3IWF, and/or another type of NF in core network 215.

Status field 508 may indicate a status associated with an NF, such as whether the NF is available, unavailable, or back-to-service. In one implementation, when a primary producer NF 404 recovers from failure, the primary producer NF 404 may send a profile update to NRF 256 to indicate that the primary producer NF 404 has come back-to-service. NRF 256 may update status field 508 of record 502 corresponding to the primary producer NF 404 to indicate that the primary producer NF 404 is back-to-service. After determining that the primary producer NF 404 is stable, the status field 408 may be updated to indicate that the primary producer NF 404 is available and any consumer NFs 402 that have switched to a secondary producer NF 406 may switch back to the primary producer NF 404.

Allowed switch back time field 510 may indicate an allowed time period during which a consumer NF 402 is allowed to switch back to the primary producer NF 404 when the primary producer NF 404 is back in service. The allowed switch back time may be specified by the primary producer NF 404. In one implementation, the allowed switch back time period may be during a time when activity associated with the primary producer NF 404 is expected to be low. For example, the allowed switch back time may be within a maintenance window, such as from midnight to 4 am. In one implementation, after a primary producer NF 404 recovers from failure, NRF 256 may wait until the time period indicated by the switch back time field 510 to send consumer NF(s) 402 an indication that primary producer NF 404 is available. In this way, consumer NF(s) 402 may switch back to primary producer NF 404 during the switch back time period.

Expected switch back time field 512 may indicate an expected switch back time after a consumer NF 402 receives a notification that the primary producer NF 404 is back in service. For example, the expected switch back time field 512 may indicate that the expected switch back time after receiving an "NF-Back-To-Service" notification may be ten minutes, half an hour, or another amount of time. In one implementation, when NRF 256 sends the "NF-Back-To-Service" notification to consumer NF 402, NRF 256 may additionally send an indication of an amount of time after receiving the "NF-Back-To-Service" notification that consumer NF 402 may perform the switch back to primary producer NF 404. The amount of time may be stored in expected switch back time field 512. After receiving the notification and the expected switch back time, consumer NF 402 may switch back to accessing primary NF 404 after the amount of time indicated in the expected switch back time has passed.

Although FIG. 5 shows exemplary components of NRF database 408, in other implementations, NRF database 408 may include fewer components, different components, additional components, or differently arranged components than depicted in FIG. 5.

Figure 6:
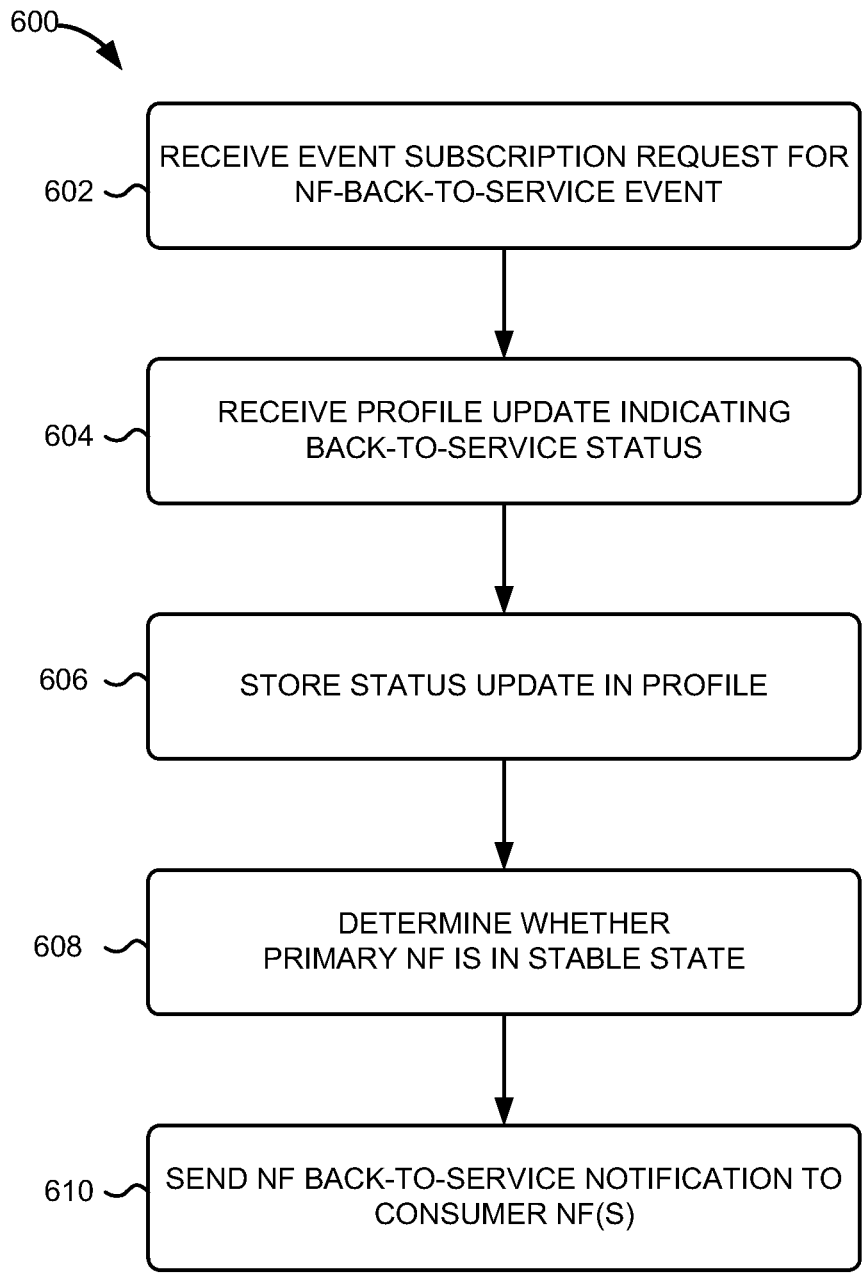
FIG. 6 is a flow diagram illustrating an exemplary process for sending a notification when a primary NF recovers after being unavailable, according to an implementation described herein.

FIG. 6 is a flow diagram illustrating an exemplary process 600 for sending a recovery notification when a primary producer NF recovers from failure. In one implementation, the steps of process 600 may be performed by NRF 256. However, in other implementations, process 600 may be performed by other elements of environment 100 and/or 200.

Process 600 may begin by receiving an event subscription request for an NF-Back-To-Service event (block 602). In one implementation, NRF 256 may receive the event subscription request from consumer NF 402 when consumer NF 402 switches from receiving services from primary producer NF 404 to secondary producer NF 406. For example, primary producer NF 404 may fail and consumer NF 402 may switch to secondary producer NF 406 in response to being unable to communicate with/receive services from primary producer NF 404. In addition, consumer NF 402 may send an event subscription request to NRF 256 requesting an NF-Back-To-Service notification when primary producer NF 404 has recovered from system failure.

When primary producer NF 404 has recovered, NRF 256 may receive a profile update indicating that a status of primary producer NF 404 has changed to Back-To-Service (block 604). For example, primary producer NF 404 may send NRF 256 a profile update to indicate its new status as Back-To-Service. NRF 256 may store the Back-To-Service status in a profile associated with primary producer NF 404 (block 606). For example, NRF 256 may store the Back-To-Service status in status field 508 of an entry in NRF database 408 associated with primary producer NF 404.

In response to receiving the Back-to-Service status update, NRF 256 may determine whether primary producer NF 404 is in a stable state (block 608). For example, NRF 256 may begin to transmit heartbeat signals (e.g., FIG. 4, signals 418) to primary producer NF 404. In one implementation, after receiving a number of successful heartbeat communications/responses from primary producer NF 404, NRF 256 may determine that primary producer NF 404 is in a stable state. In another implementation, after receiving successful heartbeat communications or responses from primary producer NF 404 for an amount of time, NRF 256 may determine that primary producer NF 404 is in a stable state. The number of successful heartbeat communications and/or the amount of time receiving heartbeat communications may be configurable and may vary based on the particular primary producer NF 404, such as the particular service provided by primary producer NF 404. For example, for an important function, the number of successful heartbeat communications and/or time may be greater than for a less important function. After determining that primary producer NF 404 is in a stable state, NRF 256 may indicate that a service status of primary producer NF 404 is normal/available. NRF 256 may store an indication that primary producer NF 404 is normal/available in status field 508 of NRF database 408.

Process 600 may continue by sending a notification to all consumer NFs 402 that subscribed to the NF-Back-To-Service event that primary producer NF 404 is back to service (block 610). In one implementation, NRF 256 may send the notification during the allowed switch back period indicated in the allowed switch back time field 510 of NRF database 408. NRF 256 may additionally send an expected switch back time indicating how long the consumer NF 402 should wait before switching back to the primary producer NF 404. The expected switch back time may be determined from the expected switch back time field 512 in NRF database 408. After receiving the NF-Back-To-Service event notification from NRF 256 and waiting the amount of time indicated by the expected switch back time, consumer NF 402 may switch back to access services provided by primary producer NF 404.

The foregoing description of implementations provides illustration and description, but is not intended to be exhaustive or to limit the invention to the precise form disclosed. Modifications and variations are possible in light of the above teachings or may be acquired from practice of the invention. For example, while a series of message flows have been described with respect to FIG. 3 and a series of blocks have been described with regard to FIG. 6, the order of the message/operation flows and blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, from a first network function, a request to receive a notification when a second network function becomes available after a failure;
   receiving, from the second network function, a status update indicating that the second network function is available;
   determining that the second network function is in a stable state; and
   sending, to the first network function, a notification that the second network function is available and an indication of a time period in which to switch from accessing a third network function to accessing the second network function.

2. The method of claim 1, wherein sending the notification includes sending the notification during a second time period indicated by the second network function.

3. The method of claim 2, wherein an indication of the second time period is stored in a profile associated with the second network function.

4. The method of claim 1, wherein determining that the second network function is in a stable state includes:
   sending one or more signals to the second network function; and
   determining that the second network function is in a stable state based on receiving one or more responses to the one or more signals.

5. The method of claim 1, wherein the third network function is a backup network function for the second network function.

6. The method of claim 1, wherein the request to receive the notification includes an identifier associated with the second network function and an expiration time for receiving the notification.

7. The method of claim 1, wherein the third network function is located in a different geographic location than the second network function.

8. A network repository function (NRF) device comprising:
   one or more processors configured to:
      receive, from a first network function, a request to receive a notification when a second network function becomes available after a failure;
      receive, from the second network function, a status update indicating that the second network function is available;
      determine that the second network function is in a stable state; and
      send, to the first network function, a notification that the second network function is available and an indication of a time period in which to switch from accessing a third network function to accessing the second network function.

9. The NRF device of claim 8, wherein, when sending the notification, the one or more processors are further configured to send the notification during a second time period indicated by the second network function.

10. The NRF device of claim 9, wherein an indication of the second time period is stored in a profile associated with the second network function.

11. The NRF device of claim 8, wherein, when determining that the second network function is in a stable state, the one or more processors are configured to:
    send one or more signals to the second network function; and
    determine that the second network function is in a stable state based on receiving one or more responses to the one or more signals.

12. The NRF device of claim 8, wherein the third network function is a backup network function for the second network function.

13. The NRF device of claim 8, wherein the request to receive the notification includes an identifier associated with the second network function and an expiration time for receiving the notification.

14. The NRF device of claim 8, wherein the third network function is located in a different geographic location than the second network function.

15. A non-transitory computer-readable medium containing instructions executable by at least one processor, the computer-readable medium comprising one or more instructions to cause the at least one processor to:
    receive, from a first network function, a request to receive a notification when a second network function becomes available after a failure;
    receive, from the second network function, a status update indicating that the second network function is available;
    determine that the second network function is in a stable state; and
    send, to the first network function, a notification that the second network function is available and an indication of a time period in which to switch from accessing a third network function to accessing the second network function.

16. The non-transitory computer-readable medium of claim 15, wherein the one or more instructions to cause the at least one processor to send the notification include one or more instructions to cause the at least one processor to send the notification during a second time period indicated by the second network function.

17. The non-transitory computer-readable medium of claim 16, wherein an indication of the second time period is stored in a profile associated with the second network function.

18. The non-transitory computer-readable medium of claim 15, wherein the one or more instructions to cause the at least one processor to determine that the second network function is in a stable state includes one or more instructions to cause the at least one processor to:
   send one or more signals to the second network function; and
   determine that the second network function is in a stable state based on receiving one or more responses to the one or more signals.

19. The non-transitory computer-readable medium of claim 15, wherein the third network function is a backup network function for the second network function.

20. The non-transitory computer-readable medium of claim 15, wherein the request to receive the notification includes an identifier associated with the second network function and an expiration time for receiving the notification.

\* \* \* \* \*